United States Patent
Senninger et al.

(10) Patent No.: US 12,313,425 B2
(45) Date of Patent: May 27, 2025

(54) REMOVE OBJECTS FROM A DIGITAL ROAD MAP

(71) Applicant: Continental Automotive GmbH, Hannover (DE)

(72) Inventors: Dominik Senninger, Burglengenfeld (DE); Holger Pietsch, Neutraubling (DE)

(73) Assignee: CONTINENTAL AUTONOMOUS MOBILITY GERMANY GMBH, Hannover (DE)

(*) Notice: Subject to any disclaimer, the term of this patent is extended or adjusted under 35 U.S.C. 154(b) by 169 days.

(21) Appl. No.: 16/738,713

(22) Filed: Jan. 9, 2020

(65) Prior Publication Data
US 2020/0225671 A1 Jul. 16, 2020

(30) Foreign Application Priority Data
Jan. 14, 2019 (DE) .................... 10 2019 200 347.8

(51) Int. Cl.
*G01C 21/00* (2006.01)
*G05D 1/00* (2024.01)
*G06V 20/56* (2022.01)

(52) U.S. Cl.
CPC ..... *G01C 21/3815* (2020.08); *G01C 21/3848* (2020.08); *G05D 1/0214* (2013.01); *G05D 1/0274* (2013.01); *G06V 20/56* (2022.01)

(58) Field of Classification Search
CPC ............... G05D 1/0214; G05D 1/0274; G05D 2201/0212; G05D 2201/0213; G06K 9/00791
See application file for complete search history.

(56) References Cited

U.S. PATENT DOCUMENTS

| 8,849,567 B2 * | 9/2014 | Gupta | G01C 21/3811 |
| | | | 701/450 |
| 9,373,255 B2 * | 6/2016 | Strauß | G08G 1/0112 |
| (Continued) | | | |

FOREIGN PATENT DOCUMENTS

| DE | 10 2012 208 254 A1 | 11/2013 | ............ G08G 1/01 |
| DE | 10 2014 111 127 A1 | 2/2016 | ............ B60W 30/06 |
| (Continued) | | | |

OTHER PUBLICATIONS

Extended European Search Report, Application No. 20151119.3, 13 pages, Jun. 17, 2020.

(Continued)

*Primary Examiner* — Jess Whittington
*Assistant Examiner* — Shahira Baajour
(74) *Attorney, Agent, or Firm* — Slayden Grubert Beard PLLC

(57) ABSTRACT

Various embodiments include a backend for an object updating system for removing objects present in a digital road map comprising: a memory storing a set of instructions; and a processor in communication with the memory. The digital road map is stored in the memory. The set of instructions, when loaded and executed by the processor, cause the processor to: receive a path and environmental data captured along this path from a vehicle; recognize objects in the environmental data; and remove an object from the digital road map if the object is not recognized in the environmental data.

5 Claims, 2 Drawing Sheets

(56) References Cited

U.S. PATENT DOCUMENTS

| | | | |
|---|---|---|---|
| 9,823,085 B2* | 11/2017 | Kunath | G06T 17/05 |
| 10,223,806 B1* | 3/2019 | Luo | G06K 9/6212 |
| 10,688,987 B2* | 6/2020 | Bariant | B60W 30/06 |
| 11,092,444 B2* | 8/2021 | Stess | G01S 7/4808 |
| 2012/0173185 A1* | 7/2012 | Taylor | G01S 7/4004 |
| | | | 356/243.1 |
| 2015/0127249 A1 | 5/2015 | Strauß et al. | 701/439 |
| 2015/0178572 A1* | 6/2015 | Omer | G08G 1/0141 |
| | | | 382/108 |
| 2017/0010115 A1 | 1/2017 | Stein et al. | 701/25 |
| 2017/0225678 A1 | 8/2017 | Bariant et al. | |
| 2017/0316333 A1* | 11/2017 | Levinson | G05D 1/0248 |
| 2018/0231387 A1* | 8/2018 | Thiel | G01C 21/3811 |
| 2019/0064799 A1* | 2/2019 | Amirloo Abolfathi | |
| | | | B60W 50/0205 |
| 2019/0094136 A1* | 3/2019 | Juette | B60Q 1/08 |
| 2019/0271551 A1 | 9/2019 | Stess | |
| 2020/0114509 A1 | 4/2020 | Lee et al. | |

FOREIGN PATENT DOCUMENTS

| | | | | |
|---|---|---|---|---|
| DE | 102016214027 A1 | 2/2018 | | G01B 11/24 |
| WO | 2018/230852 A1 | 12/2018 | | G01S 13/88 |

OTHER PUBLICATIONS

German Office Action, Application No. 10 2019 200 347.8, 6 pages, Nov. 25, 2019.

Extended European Search Report, Application No. 20151119.3, 15 pages, Nov. 30, 2020.

* cited by examiner

REMOVE OBJECTS FROM A DIGITAL ROAD MAP

CROSS-REFERENCE TO RELATED APPLICATIONS

This application claims priority to German Patent Application No. DE 10 2019 200 347.8, filed on Jan. 14, 2019 with the German Patent and Trademark Office. The contents of the aforesaid application are incorporated herein for all purposes.

TECHNICAL FIELD

The present disclosure relates to maps. Various embodiments may include backends for an object updating system for removing objects present in a digital road map, vehicles for an object updating system, object updating systems, methods for removing objects present in a digital road map, program elements, and/or computer-readable media.

BACKGROUND

Vehicles are increasingly equipped with driver assistance systems which assist the driver when carrying out driving maneuvers. Furthermore, vehicles are increasingly equipped with highly or fully automatic driving functions. Highly precise digital road maps are required for these highly or fully automatic driving functions in order to ensure safe and reliable navigation of the vehicles and to recognize objects such as traffic signs or road markings. Furthermore, these digital road maps must have the current status of the roads and traffic signs in order to enable the highly or fully automatic driving functions. Furthermore, modern vehicles have a large number of sensors for capturing the vehicle environment. It is a great challenge to keep these digital road maps current.

SUMMARY

Teachings of the present disclosure include systems and/or method to keep a digital road map current. For example, some embodiments include a backend (2) for an object updating system for removing objects (31) which are present in a digital road map (3), wherein the digital road map (3) with objects (31) which are present is stored on the backend (2); and wherein the backend (2) is configured to receive a path and environmental data captured along this path from a vehicle (4) and to recognize objects (31) in these environmental data, and wherein the backend (2) is configured to remove an object (31) which is present in the digital road map (3) from the latter if this object (31) cannot be recognized by the backend (2) in the environmental data captured by the vehicle (4).

In some embodiments, each object (31) present in the digital road map (3) has a probability value for its existence, wherein the backend (2) is configured to reduce the probability value for an object (31) present in the digital road map (3) if this object (31) cannot be recognized by the backend (2) in the environmental data captured by the vehicle (4).

In some embodiments, the backend (2) is configured to remove an object (31) which is present in the digital road map (3) from the latter if the probability value for its existence undershoots a predefined limit value.

In some embodiments, the backend (2) is configured to determine, on the basis of boundary conditions, whether it is possible to recognize the object (31) on the basis of the environmental data captured by the vehicle (4).

In some embodiments, the boundary conditions for the possible recognition of the objects (31) are based on physical parameters of a capture unit (13) used in the vehicle.

In some embodiments, the boundary conditions have at least one of the following: the distance between the object (31) and the capture unit (13) is shorter than the maximum recognition range of the capture unit (13), the angle between the direction of travel and the object (31) is less than half the opening angle of the capture unit (13), or the angle between the direction of travel and the orientation of the object (31) is less than the specification of the capture unit (13).

In some embodiments, the boundary conditions also comprise the time, the season or the weather conditions of the environmental data of the vehicle (4).

In some embodiments, the backend (2) is configured to check, in the case of an object (31) to be newly included in the digital road map (3), on the basis of the path and the environmental data from the vehicle (4) which are captured along this path, whether this object (31) was already present in environmental data from other vehicles.

As another example, some embodiments include a vehicle (4) for an object updating system, having an environmental data capture apparatus (1), wherein the environmental data capture apparatus (1) has: a capture unit (13); a positioning unit (11); and a transmitting/receiving unit (12), wherein the capture unit (13) is configured to capture environmental data of the vehicle (4), wherein the positioning unit (12) is configured to determine the position of the vehicle (4) and the path covered by the vehicle (4), wherein the transmitting/receiving unit (12) is configured to transmit the path covered and the environmental data captured along this path to the backend (2).

As another example, some embodiments include an object updating system for removing objects (31) which are present in a digital road map (3), having: a backend (2) as described above; and a vehicle (4) having an environmental data capture apparatus (1) as described above.

As another example, some embodiments include a method for removing objects which are present in a digital road map, having the following steps of: capturing (S1) environmental data by means of a capture unit; determining (S2) the position of the captured environmental data and the path covered by a vehicle; transmitting (S3) the path covered and the environmental data captured along this path from a transmitting/receiving unit to a backend; receiving (S4) the transmitted environmental data by means of the backend; recognizing (S5) objects in the received environmental data by means of the backend; and removing (S6) an object which is present in the digital road map from the latter if this object cannot be recognized by the backend in the transmitted environmental data.

As another example, some embodiments include a program element which, when executed on a backend (2), instructs the backend (2) to carry out the method steps for the backend as described above.

As another example, some embodiments include a computer-readable medium on which the program element as described above is stored.

BRIEF DESCRIPTION OF THE DRAWINGS

Further features, advantages, and possible uses of the teachings herein emerge from the following description of the exemplary embodiments and the figures. The figures are schematic and not true to scale. If the same reference signs are specified in the following description of the figures, they denote identical or similar elements.

DETAILED DESCRIPTION

Figure 1:
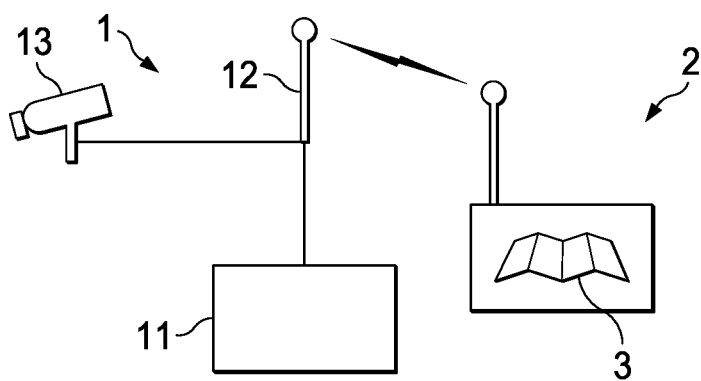
FIG. 1 shows a block diagram of an object updating system incorporating teachings of the present disclosure.

Some embodiments of the teachings herein include a backend for an object updating system for removing objects which are present in a digital road map. The digital road map with objects which are present is stored on the backend. The backend is configured to receive a path and environmental data captured along this path from a vehicle and to recognize objects in these environmental data. The backend is also configured to remove an object which is present in the digital road map from the latter if this object cannot be recognized or has not been recognized by the backend in the environmental data captured by the vehicle.

An object can therefore be removed from the digital road map again if it has not been recognized by the backend in the environmental data of the vehicle. As a result, the digital road map which is stored on the backend can always be kept current. In other words, the digital road map can be freed from superfluous and/or out-of-date objects. It should be noted that the backend can receive environmental data from a multiplicity of different vehicles. The backend can recognize objects in each of these received environmental data items and can accordingly adapt the digital road map and/or remove objects from the latter.

The term "digital road maps" or "digital maps" should also be understood as meaning road maps for advanced driver assistance systems (ADASs). In particular, these digital road maps can be stored and created in a backend. It should be noted that the backend can also transmit the digital road map stored there to the vehicles again. An object which is present in a digital road map may be in this case, for example, a traffic sign, a guardrail, a road marking, traffic lights, a roundabout, a crosswalk or a speed bump.

Backend can be understood as meaning a computing unit which is outside the ego vehicle and is available for a multiplicity of vehicles or object recognition apparatuses. The backend can also have a plurality of computing units which are distributed over different locations (throughout the world). The backend may be, for example, a server or a cloud which can be reached via the Internet or another network and with which data can be interchanged.

In some embodiments, each object present in the digital road map has a probability value for its existence. The backend is configured to reduce the probability value for an object present in the digital road map if this object cannot be recognized or has not been recognized by the backend in the environmental data captured by the vehicle. An object in the digital road map is therefore not immediately removed from the latter if it has not been recognized once by the backend in the environmental data of the vehicle, but rather the probability of its existence is accordingly reduced. If this probability value undershoots a predefined limit value, the object is removed from the digital road map. The probability value can typically be between 0 and 1 and if, for example, an object undershoots the probability value of 50%, 60% or 70%, it can be removed from the digital road map.

In some embodiments, the backend is configured to remove an object which is present in the digital road map from the latter if the probability value for its existence undershoots a predefined limit value. The backend can also remove an object from the digital road map if the probability value for the existence of this object falls below a predefined limit value, for example 60%, or if the object has not been recently recognized by a predefined number of vehicles. "Old" objects which in reality are no longer present can therefore be removed from the digital road map.

In some embodiments, the backend is configured to determine, on the basis of boundary conditions, whether it is possible to recognize the object on the basis of the environmental data captured by the vehicle. In other words, the backend can take into account whether recognition was possible. This can depend, in particular, on boundary conditions which influence the environmental data.

In some embodiments, the boundary conditions for the possible recognition of the objects are based on physical parameters of a capture unit used in the vehicle. It should be noted that the physical parameters can differ depending on the sensors or sensor types used. These physical parameters can be transmitted from the vehicle to the backend, for example by means of metadata, with the result that the backend can accordingly take these parameters into account.

In some embodiments, the boundary conditions have at least one of the following: the distance between the object and the capture unit is shorter than the maximum recognition range of the capture unit, the angle between the direction of travel and the object is less than half the opening angle of the capture unit, or the angle between the direction of travel and the orientation of the object is less than the specification of the capture unit. If one of these boundary conditions is violated, the backend was not able to recognize the object in the environmental data and there is no need to remove this object from the digital road map.

In some embodiments, the boundary conditions also comprise the time, the season or the weather conditions of the environmental data of the vehicle. Therefore, it is also possible to take into account boundary conditions, for example low sun, fog or thick snowfall, which can influence the sensors in the capture unit. As a result, the backend can assess the recognizability or the probability value for the existence of the object in an improved and more accurate manner.

In some embodiments, the backend is configured to check, in the case of an object to be newly included in the digital road map, on the basis of the path and the environmental data which are captured along this path, whether this object was already present in environmental data from previous journeys and to determine the probability value of its existence on the basis of this check. The backend can therefore see into the past in order to determine whether a particular object was already present in environmental data from previous journeys. The backend can therefore deliberately search for objects along a vehicle path in order to provide new objects with a more accurate probability value for their existence or in order to include an object in the digital road map.

Some embodiments include a vehicle for an object updating system, having an environmental data capture apparatus. The environmental data capture apparatus has a capture unit, a positioning unit and a transmitting/receiving unit. The capture unit is configured to capture environmental data of the vehicle. The positioning unit is configured to determine the position of the vehicle and the path covered by the vehicle. The transmitting/receiving unit is configured to transmit the path covered and the environmental data captured along this path to the backend. The capture unit may have various sensors, for example a camera, a lidar sensor, a radar sensor or an ultrasonic sensor. Furthermore, these sensors may already be present in the vehicle.

The transmitting/receiving unit can transmit the data to the backend wirelessly over the air. The data can be wirelessly transmitted and/or wirelessly received by Bluetooth, WLAN (for example WLAN 802.11a/b/g/n/ac or WLAN 802.11p), ZigBee or WiMax or else by means of cellular radio systems such as GPRS, UMTS, LTE or 5G. It is also possible to use other transmission protocols. The specified protocols provide the advantage of the standardization which has already taken place.

The vehicle may comprise, for example, a motor vehicle, such as an automobile, a bus or a truck, or else a rail vehicle, a ship, an aircraft, such as a helicopter or an airplane, or for example a bicycle. In some embodiments, GPS for positioning the positioning unit is representative of all global navigation satellite systems (GNSSs), such as e.g. GPS, Galileo, GLONASS (Russia), Compass (China), IRNSS (India). In some embodiments, the position determination of the vehicle can also be effected by means of cell positioning. This is possible, in particular, when using GSM, UMTS or LTE networks.

Some embodiments include an object updating system for removing objects which are present in a digital road map. The object updating system has a backend described above and below and a vehicle described above and below with an environmental data capture apparatus.

Some embodiments include a method for removing objects which are present in a digital road map. The method comprises the following steps:
  capturing environmental data by means of a capture unit;
  determining the position of the captured environmental data and the path covered by a vehicle;
  transmitting the path covered and the environmental data captured along this path from a transmitting/receiving unit to a backend;
  receiving the transmitted environmental data by means of the backend;
  recognizing objects in the received environmental data by means of the backend; and
  removing an object which is present in the digital road map from the latter if this object cannot be recognized by the backend in the transmitted environmental data.

In some embodiments, the steps of the method can also be carried out in a different order or at the same time. Furthermore, there may also be a longer period between individual steps.

Some embodiments include a program element which, when executed on a backend, instructs the backend to carry out the method steps described above and below for the backend or to at least carry out the method steps of receiving, recognizing and removing. Some embodiments include a computer-readable medium on which a program element is stored, which program element, when executed on a backend, instructs the backend to carry out the method steps described above and below for the backend or to at least carry out the method steps of receiving, recognizing and removing.

FIG. 1 shows a block diagram of an example object updating system incorporating teachings of the present disclosure. The object updating system has an environmental data capture apparatus 1 and a backend 2. The environmental data capture apparatus 1 in turn has a positioning unit 11, a transmitting/receiving unit 12 and a capture unit 13. The environmental data capture apparatus 1 is advantageously installed in a vehicle, with the result that it can capture environmental data of the vehicle and environmental data along the path of the vehicle. The environmental data capture apparatus 1 and the backend 2 can interchange data with one another, in particular environmental data, and this can be carried out wirelessly via mobile radio networks, for example.

A digital road map 3 having a plurality of objects can be stored on the backend 2. The backend 2 can receive the environmental data of the vehicle which are captured by the environmental data capture apparatus 1. For this purpose, the environmental data capture apparatus 1 can instruct the transmitting/receiving unit 13 to transmit the environmental data to the backend 2. The backend 2 can evaluate the received environmental data of the vehicle and can recognize objects in said data. The backend 2 can compare these recognized objects with the objects present in the digital road map 3.

An object which is present in the digital road map 3 but was not able to be recognized by the backend 2 in the environmental data transmitted by the vehicle can be removed from the digital road map 3 by the backend 2. As a result, objects can be removed from the digital road map again, with the result that the latter is always current. Furthermore, each object in the digital road map 3 may have a probability value for its existence. In other words, a value which indicates the probability with which this object actually (in reality) exists. In this case, the backend 2 can reduce the probability value for the object if this object cannot be recognized by the backend 2 in the environmental data captured by the vehicle. Furthermore, as soon as a predefined limit value of the probability value (for example 60%, 70% or 80%) for the existence of a certain object has been undershot, this object can be removed from the digital road map.

The backend 2 can also take into account further parameters and boundary conditions when recognizing objects in the environmental data captured by the vehicle in order to determine whether recognition was actually possible. For example, the distance between the object to be recognized and the vehicle may be greater than the maximum visibility range of the sensor and the backend 2 therefore cannot recognize an object in these environmental data. It follows from this that the object is not removed from the digital road map in this case since recognition was not possible at all.

Further boundary conditions may be that the angle between the direction of travel and the object 31 is less than half the opening angle of the capture unit 13, or that the angle between the direction of travel and the orientation of the object 31 is less than the specification of the capture unit 13. In other words, these may be physical properties of the respective sensor or sensor type used. It should therefore be noted that these properties depend on the respective sensor and can be transmitted to the backend by means of metadata, with the result that the backend can accordingly assess the boundary conditions. Furthermore, it is also possible to take into account further boundary conditions such as the time, season or weather. For example, a camera as a sensor cannot capture any suitable image data in the case of fog, direct sunlight or driving snow, with the result that the maximum recognition distance for objects is reduced.

In some embodiments, the backend 2, if it intends to add a new object to the digital road map, can search the environmental data from earlier journeys or other vehicles which are already present on the backend 2 and in this case can check whether this new object was already present in previous environmental data from vehicles. If the object was already present in earlier environmental data, this can result in a higher probability value for the existence of this object. In other words, the backend 2 can see into the past and can deliberately search older environmental data for certain objects.

In some embodiments, the backend 2 can have a storage unit and a computing unit. Furthermore, the backend 2 may be distributed over a plurality of locations. The backend 2 can also be reached via the Internet or another computer network, for example as a cloud. It should also be noted that the backend can receive and evaluate environmental data from a multiplicity of different vehicles.

The backend 2 can also transmit data, such as the current digital road map 3, to the environmental data capture apparatus 1. The transmitting/receiving unit 12 of the environmental data capture apparatus 1 can be used, in particular, to interchange the data. The capture unit 13 can be configured to capture environmental data; in particular, the capture unit can capture environmental data of a vehicle using different sensors. The capture unit 13 may be, for example, a camera, a stereo camera, a lidar sensor, a radar sensor, an ultrasonic sensor or a combination thereof. The capture unit 13 can capture temporally successive environmental data, for example a video or a plurality of individual successive images (frames). The positioning unit 11 can be configured to capture the position of the environmental data capture apparatus 1 of the vehicle and the path covered by the vehicle. For example, the positioning unit 11 may be a GPS sensor.

In this case, an object may be, for example, a traffic sign, a guardrail, a road marking, traffic lights, a roundabout, a crosswalk or a speed bump.

The transmission of the data by the transmitting/receiving unit 12 to the backend 2 can be carried out both continuously and progressively, that is to say at particular times, for example every minute.

Figure 2:
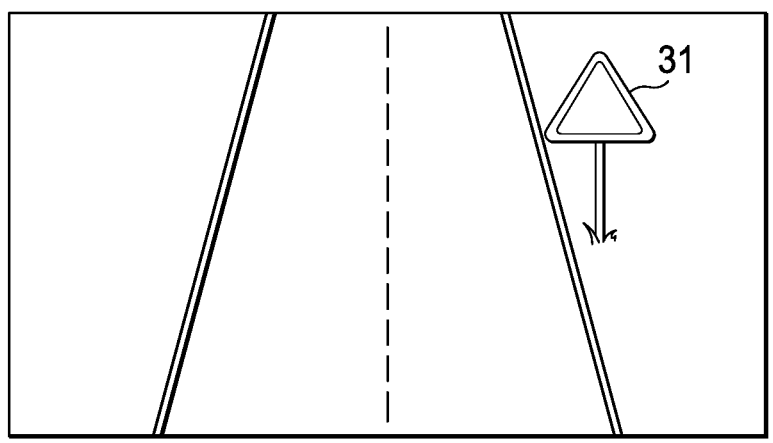
FIG. 2 shows a schematic illustration of environmental data containing an object incorporating teachings of the present disclosure.

FIG. 2 shows an exemplary image of the environmental data. A road is illustrated in this case. A traffic sign which is recognized as an object 31 by the backend is situated at the edge of this road. This image, the position and the path covered by the vehicle can be transmitted to the backend which in turn recognizes the object 31 in the environmental data and accordingly adapts the digital road map or removes an object which is not included in the environmental data from the digital road map.

Figure 3:
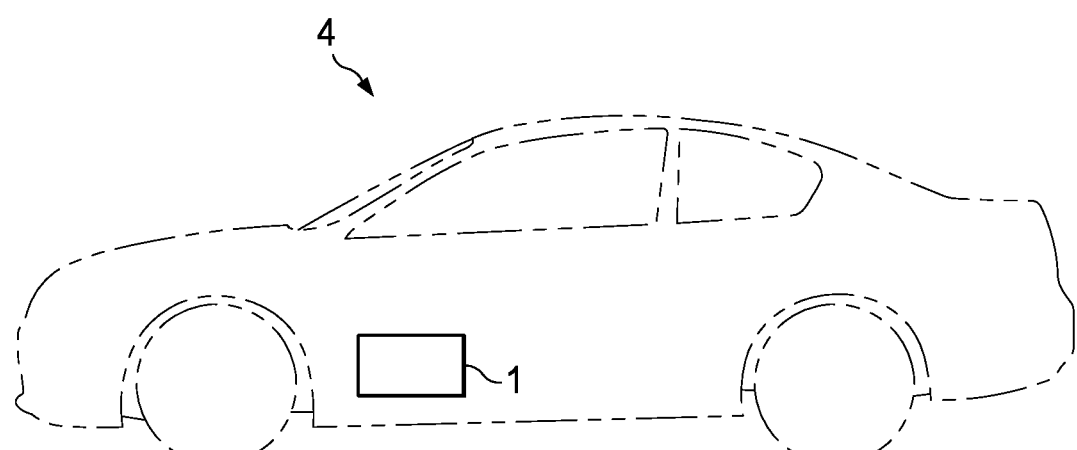
FIG. 3 shows a vehicle having an environmental data capture apparatus incorporating teachings of the present disclosure.

FIG. 3 shows a vehicle 4 having an environmental data capture apparatus 1. This environmental data capture apparatus 1 can capture environmental data around the vehicle 4. The environmental data capture apparatus 1 can also transmit the captured environmental data to the backend. Furthermore, a multiplicity of vehicles 4 having the described environmental data capture apparatus 1 can capture environmental data and can transmit the latter to the backend.

Figure 4:
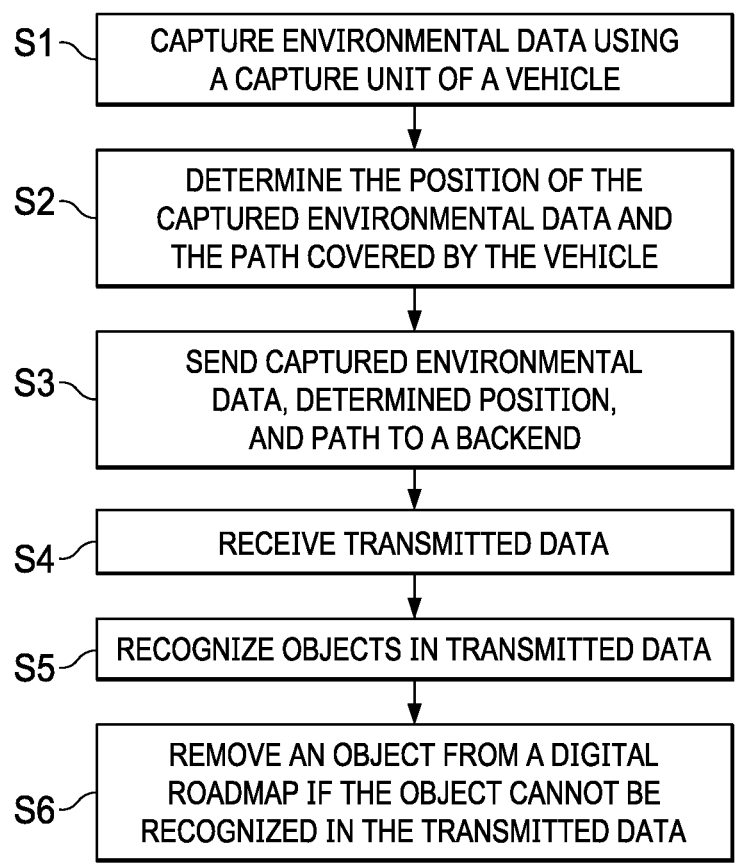
FIG. 4 shows a flowchart for a method for removing objects which are present in a digital map in the backend incorporating teachings of the present disclosure.

FIG. 4 shows a flowchart for a method for removing objects which are present in a digital road map. In a first step S1, environmental data can be captured by a capture unit of an environmental data capture apparatus of a vehicle. In a step S2, the position of the captured environmental data and the path covered by the vehicle can be determined, with the result that environmental data are present along the path covered. This path covered and the environmental data captured along this path can be sent or transmitted from a transmitting/receiving unit of the environmental data capture apparatus of the vehicle to a backend in step S3. In step S4, the backend can receive the transmitted environmental data. The backend can then recognize objects in these received environmental data in step S5. In a step S6, the backend can remove an object which is present in the digital road map from the latter if this object cannot be recognized by the backend in the transmitted environmental data.

What is claimed is:

1. A backend for an updating system for a digital road map storing multiple mapped objects, the backend comprising:
   a memory storing a set of instructions; and
   a processor in communication with the memory;
   wherein the digital road map is stored in the memory, the stored digital road map including multiple mapped objects at respective mapped locations; and
   wherein the set of instructions, when loaded and executed by the processor, cause the processor to update the stored digital road map by:
     receiving a path and environmental data captured along this path from a vehicle, including reliability indicators for the captured environmental data;
     access the stored digital map to identify a set of mapped objects along the path;
     analyzing the environmental data to identify real-world objects;
     comparing the identified objects to the set of mapped objects; and
     upon determining that a mapped object of the multiple mapped objects is stored in the digital road map and has no equivalent among the identified objects: if the reliability indicators meet one or more criteria, removing the mapped object from the digital road map and else, keeping the mapped object in the digital road map;
   wherein the reliability indicators define a time, a season, and/or weather conditions during collection of the environmental data;
   each mapped object in the digital road map has an associated probability value representing a likelihood the mapped object is located in the digital road map at a position corresponding to a real world position of the object;
   if a second mapped object of the multiple mapped objects stored in the digital road map has no equivalent among the identified objects, the instructions further cause the processor to reduce a respective associated probability value for the second mapped object; and
   the instructions further cause the processor to remove the second mapped object from the digital road map if the associated probability value undershoots a predefined limit value.

2. The backend as claimed in claim 1, wherein the instructions further cause the processor to:
   recognize an unmapped object based on the environmental data and to check, based at least in part on the path and the environmental data captured along the path, whether the unmapped object was present in environmental data received from other vehicles.

3. An updating system for a digital road map storing multiple mapped objects, the system comprising:
   a memory storing a set of instructions; and
   a processor in communication with the memory;
   wherein the digital road map is stored in the memory, the stored digital road map including multiple mapped objects at respective mapped locations; and wherein the set of instructions, when loaded and executed by the processor, cause the processor to update the stored digital road map by:
receiving a path and environmental data captured along this path from a vehicle, including reliability indicators for the captured environmental data;
accessing the stored digital map to identify a set of mapped objects along the path;
analyzing the environmental data to identify real-world objects
comparing the identified objects to the set of mapped objects; and
upon determining that a mapped object of the multiple mapped objects is stored in the digital road map and has no equivalent among the identified objects: if the reliability indicators meet one or more criteria, removing the mapped object from the digital road map and else, keeping the mapped object in the digital road map;
wherein the reliability indicators define a time, a season, and/or weather conditions during collection of the environmental data;
a capture unit configured to capture the environmental data of the vehicle;
a positioning unit configured to determine a position of the vehicle and the path travelled by the vehicle; and
a transceiver configured to transmit the path travelled and the environmental data captured along the path to a backend system;
each mapped object in the digital road map has an associated probability value representing a likelihood the mapped object is located in the digital road map at a position corresponding to a real world position of the object;
if a second mapped object of the multiple mapped objects stored in the digital road map has no equivalent among the identified objects, the instructions further cause the processor to reduce a respective associated probability value for the second mapped object; and
the instructions further cause the processor to remove the second mapped object from the digital road map if the associated probability value undershoots a predefined limit value.

4. A method for updating a digital road map storing multiple mapped objects, the method comprising:
capturing environmental data using a capture unit in a vehicle, including reliability indicators for the captured environmental data;
determining a position of the vehicle corresponding to the captured environmental data and a path travelled by the vehicle;
transmitting the path and the environmental data captured along this path from a transceiver to a backend including the reliability indicators;
receiving the transmitted environmental data at the backend;
accessing the digital road map from a storage to identify a set of mapped objects along the path;
analyzing the environmental data to identify real-world objects; and
upon determining that a mapped object of the multiple mapped objects is stored in the digital road map and has no equivalent among the identified objects: if the reliability indicators meet one or more criteria, removing the mapped object from the digital road map and else, keeping the mapped object in the digital road map;
wherein the reliability indicators define a time, a season, and/or weather conditions during collection of the environmental data;
each mapped object in the digital road map has an associated probability value representing a likelihood the mapped object is located in the digital road map at a position corresponding to a real world position of the object;
if a second mapped object of the multiple mapped objects stored in the digital road map has no equivalent among the identified objects, the instructions further cause the processor to reduce a respective associated probability value for the second mapped object; and
the instructions further cause the processor to remove the second mapped object from the digital road map if the associated probability value undershoots a predefined limit value.

5. A non-transitory computer-readable medium storing a program, the program, when loaded and executed by a processor, causing the processor to execute a method for updating a digital road map storing multiple mapped objects, the method comprising:
capturing environmental data using a capture unit in a vehicle including reliability indicators for the captured environmental data;
determining a position of the vehicle corresponding to the captured environmental data and a path travelled by the vehicle;
transmitting the path and the environmental data captured along this path from a transceiver to a backend including the reliability indicators;
receiving the transmitted environmental data at the backend;
analyzing the environmental data to identify real-world objects;
accessing the digital road map from memory, the digital road map including multiple mapped objects at respective mapped locations along the path;
upon determining that a mapped object of the multiple mapped objects is stored in the digital road map and has no equivalent among the identified objects: if the reliability indicators meet one or more criteria, removing the mapped object from the digital road map and else, keeping the mapped object in the digital road map;
wherein the reliability indicators define a time, a season, and/or weather conditions during collection of the environmental data;
each mapped object in the digital road map has an associated probability value representing a likelihood the mapped object is located in the digital road map at a position corresponding to a real world position of the object;
if a second mapped object of the multiple mapped objects stored in the digital road map has no equivalent among the identified objects, the instructions further cause the processor to reduce a respective associated probability value for the second mapped object; and
the instructions further cause the processor to remove the second mapped object from the digital road map if the associated probability value undershoots a predefined limit value.

* * * * *